Figure 1:
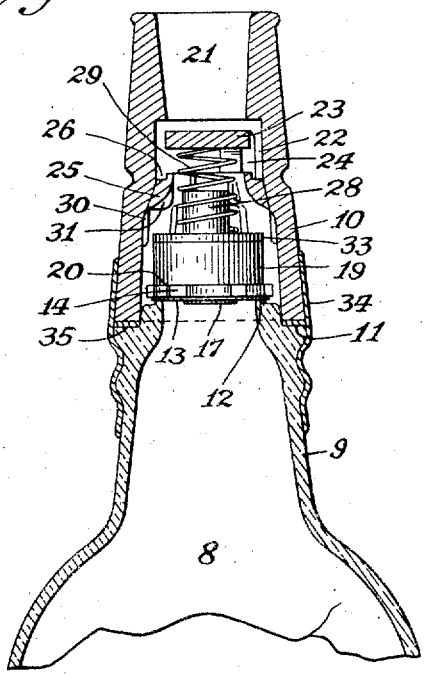

G. P. VAN WYE.

NON-REFILLABLE BOTTLE.

APPLICATION FILED MAR. 16, 1916.

Reissued May 23, 1916. 14,138.

Attest:
L. E. Johnston

Inventor:
Garry P. Van Wye,
by Merwin & Swearton Attys.

UNITED STATES PATENT OFFICE.

GARRY P. VAN WYE, OF NEW YORK, N. Y., ASSIGNOR TO EDGEWORTH GREENE, OF MONTCLAIR, NEW JERSEY.

NON-REFILLABLE BOTTLE.

14,138. Specification of Reissued Letters Patent. Reissued May 23, 1916.

Original No. 1,163,289, dated December 7, 1915, Serial No. 777,516. Application for reissue filed March 16, 1916. Serial No. 84,739.

*To all whom it may concern:*

Be it known that I, GARRY P. VAN WYE, a citizen of the United States, residing in New York, borough of Manhattan, county and State of New York, have invented new and useful Improvements in Non-Refillable Bottles, of which the following is a specification.

This invention relates to bottles, and especially to that class where mechanism is employed to prevent the refilling of the same after being emptied; and the object of my invention is to provide a bottle of the character described which will have the general appearance of bottles in common use for the same purpose, which will carry mechanism proportioned in size to such a construction and shape, and which can not be refilled without mutilation.

In the whisky trade, and in other places where a non-refillable bottle is desired, the large bottlers oppose the adoption of a bottle materially different in shape from the bottles they have used so long a time as to practically constitute a trade mark, or, more properly a trade shape, for the shape of a bottle on a bar side-board often leads a customer to recognize the particular kind of liquor desired. In making a non-refillable bottle, however, the space in which the valve mechanism must work has to be considered for the reason that where there is considerable room the parts can be handled with greater freedom and certainty than in confined spaces. Further, the material that can be used is restricted not only to that which will not be affected by any alcohol which may be in the liquor, but also must not contaminate the liquor or injure or affect the taste of the same. It is also necessary that all parts shall be so constructed that they will be comparatively cheap to manufacture, easy to assemble, and effective in use.

In carrying out my invention I have found the following conditions desirable: 1, the valve-seat should be flat, and preferably integral with the bottle; 2, the valve should be of light, yielding material, and should rest practically flat on the seat; 3, a holder should be provided to position the valve on the seat; 4, the valve and holder should be buoyant; 5, a weight should be provided, adapted to coact with the valve, but movable independently of the same under certain conditions; 6, means must be provided to seat the valve when the bottle is in any position that water will flow thereinto by gravity; 7, a guard must be provided to inclose and protect the foregoing parts against being engaged by any instrument, but permitting a good flow of liquid from the bottle; and 8, simple and efficient means must be provided to secure the guard and parts on a bottle.

In making a non-refillable bottle it is necessary to provide some means to insure the pouring of the contents other than depend upon the weight of the liquid within the bottle to open the valve. The pressure of the atmosphere against the valve from without is usually greater than the pressure of the liquid from within so that the bottle will not pour without additional means besides the weight of the liquid to force the valve away from its seat. If, however, a weight is attached to the valve, it will always hold the valve open when the bottle is inverted; and on exhausting the air from the bottle, liquid will freely flow in to replace the same. To overcome this I have so constructed a valve and weight that they will be held together by adhesion when the bottle is inverted for pouring; but this connection will be broken by inflowing liquid, I thus have a valve and weight connected when desired, and disconnected when desired, using one force of nature to offset another.

The invention is illustrated in the accompanying drawing, in which—

Figure 2:
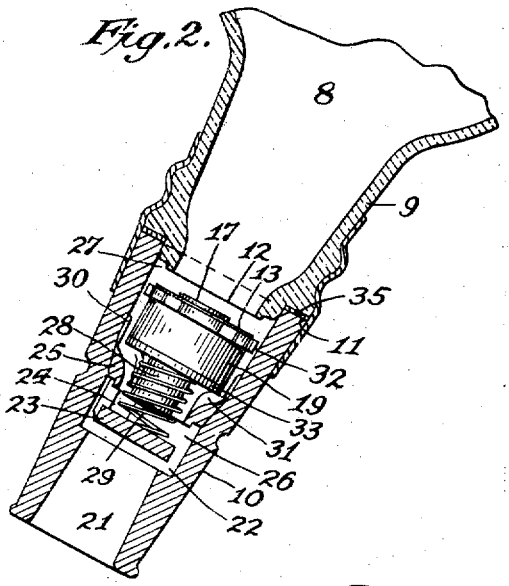
Figure 4:
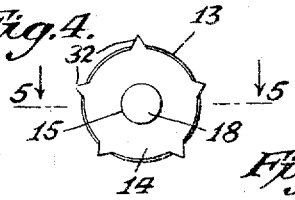
Figure 3:
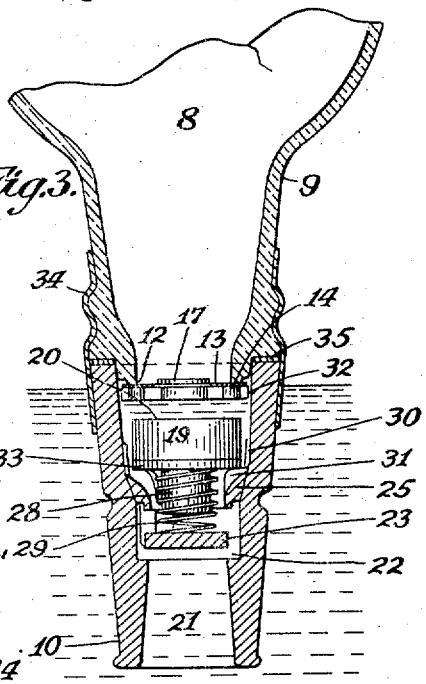
Figure 5:
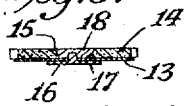
Figure 6:
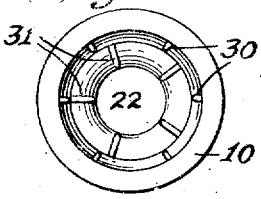
Figure 7:
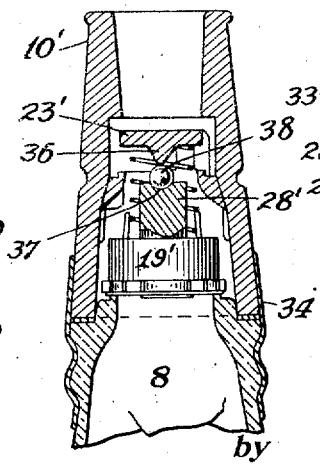

Figure 1, is a sectional elevation of the top of a bottle, and guard constructed according to my invention, and an elevation of the valve mechanism in place; Fig. 2, is a view of the same in a pouring position; Fig. 3, is a similar view of the bottle and parts inverted illustrating the seating of the valve by buoyancy; Fig. 4, is a top plan view of the valve; Fig. 5, is a sectional view of the same, on the line 5—5 of Fig. 4; Fig. 6, is a bottom plan view of the guard; and, Fig. 7, is a view similar to Fig. 1, but showing a modified form of construction.

Like numerals of reference refer to the same parts in each of the views.

In practice I may use a bottle of any shape; but as shown in the drawing, a bottle having a top shaped like the frustum of a cone is imitated; and in carrying out the invention I have made a part of the neck integral with the bottle and the other portion of porcelain, or the like, of a shape so that when secured to the bottle the shape of the completed neck will closely resemble the size and shape of the neck and head of the bottle imitated. In the drawing, a bottle and top are shown secured together not only to illustrate how the shape of an ordinary bottle can be imitated; but to illustrate how the parts adapt themselves to the construction to make a perfect article.

In the drawing, the bottle or reservoir 8, is provided with a neck 9, of a length so that when a top 10 is secured in place the completed bottle will be practically of the same height and contour as the bottle in common use imitated.

The neck 9, is provided at the top thereof with a seat 11, on which is mounted the guard 10; and within the guard the neck extends upward to form an annular, flat valve-seat 12 on which I mount the valve 13. This valve is one of the most important features of my invention. I have found in practice that a disk of pure tin, commonly known as "block tin," is most suitable for the purpose of making a valve; and this tin should not vary much from about four thousandths of an inch in thickness. If thicker than this the valve will be lacking in pliability and will fail to cling to the seat sufficiently close to prevent the entrance of liquid under pressure; and if the valve is thinner it will readily become distorted under air pressure thereby permitting leakage. As tin, however, as thin as four thousandths of an inch is extremely pliable, means must be provided to hold the same extended to engage the entire valve-seat; and means must also be provided to prevent the center of the valve being drawn downward into the bottle under air pressure as thereby the diameter of the valve would be shortened and a part of the seat would be uncovered permitting leakage. It is also necessary to provide means to draw the valve away from the seat when desirous of pouring out the contents of the bottle for the reason that liquid can not be poured from a bottle without admitting air to take its place, and the tendency of the air to flow in, will keep the valve seated unless means are provided to unseat it other than, or in addition to, the weight of the liquid contained in the bottle.

In taking care of these conditions, I have provided a valve-holder which fully complies with the first two conditions; and is constructed to coact with another part hereinafter to be described whereby the third condition is met. A fourth condition is, that the valve should be buoyant so as to be seated by inflowing liquid when the bottle is inverted.

With the above objects in view I provide a cork disk 14, preferably a little less in diameter than that of the valve 13, so that when assembled the edges of the valve will project a little beyond the disk on all sides, as clearly shown in Fig. 4, whereby the atmosphere, or pressure thereof, will always be free to engage the free edges of the valve to force the same into close contact with the valve seat. This disk is provided with a central bore 15; and the valve 13, is secured in place by taking a tin rivet 16, with a shank adapted to project into the opening 15, in the cork disk, and having a flat head 17, sufficient in diameter to overlap a considerable portion of the center of the valve 13, but not large enough to come in contact with the valve-seat at any time. The parts are conveniently assembled by perforating the valve centrally to permit of the passage therethrough of the shank of the rivet until the flat head makes close contact with the central part of the valve; then after centralizing the shank of the rivet in the opening 15, in the cork disk, molten tin is poured in to fill the opening, as shown in Fig. 5; and this molten tin will adhere not only to the shank of the rivet, but to the exposed part of the valve around the rivet shank thereby effectively sealing the same against the passage of either liquid, or air. As the head of the rivet is considerably greater in diameter than the hole 15, a part of the valve-disk will be covered by the said head that is not engaged by the adhering tin just described; and in practice, or action, the head of the rivet will prevent this part of the disk from being drawn into the bottle under pressure, and will also prevent the working up and down of the metal of the valve at the edge of the adhering metal thereby preventing injury. In making the hole 15, I make the same flaring so that when completed the tin plug 18, will be wider at the top than at the valve-engaging side thereby being prevented from pulling through the hole.

As thus constructed, the valve 13, will always be held in a flat, extended manner to engage the valve-seat; it will also be held centrally on the under side against being drawn into the bottle under pressure thereby shortening or crimping the same; and as the disk 14, is made of cork, the valve will be buoyantly supported when under the condition shown in Fig. 3. Thus a very simple and efficient valve and holder therefor is provided.

As previously stated, where a light valve is used, means must be provided to assist the contained liquid in unseating the valve when it is desired to pour out any part of the contents of the bottle. The means I have provided is a weight 19, having a flat bottom 20, adapted to rest on the cork disk 14; and as thus constructed, when the parts are wet, as they always are in use, the weight will adhere to the cork disk while the bottle is being inverted, and being thus connected the weight will either draw the valve from its seat, or assist the liquid in the bottle in dislodging the same. As the connection between the weight and valve, however, is adhesion, and this occurs only when the parts are wet with the valve not free to move independently of the weight; when the bottle is inverted and partly submerged, as shown in Fig. 3, the adhesion will be broken, and the valve will be carried to its seat by the buoyancy of the cork part of the holder. Thus if air is exhausted from the bottle, and the bottle is then submerged, the valve will move independently of the weight, and will close the bottle. I am thus able to have my weight and valve connected when desired, and disconnected when desired. By making the valve and holder as shown and described, there is nothing to prevent the weight from engaging the valve holder adhesively and coacting therewith; and there is nothing used in the construction of the valve that is in any way injurious to any liquor that may be contained in the bottle.

The guard 10, is not only shaped to conform in outline with the bottle being imitated; but has parts coacting with the working parts which I will now describe.

The guard is provided with a cork socket 21, at the bottom of which is an enlarged chamber, or pocket 22, in which is mounted a baffle plate 23, supported by legs 24, on a collar 25, between the upper rim of which and the shell of the guard is a channel 26, so positioned that a wire, or any instrument passing the baffle plate 23, will be caught in this channel, and will be prevented entering the valve chamber to engage and hold, or unseat the valve. The collar 25, projects inwardly beneath the baffle plate 23, whereby the passageway through the guard is constricted; and the weight 19, is provided with a stem 28, adapted to enter the passageway through the collar; and a coil spring 29, is mounted on this stem with one end bearing against the weight while the other end bears against the baffle plate 23, and the parts are so proportioned that the end of the stem is free to move up and down within the spring which is so proportioned in strength that it will be compressed by the weight when in the position shown in Figs. 2, or 3, but will move the weight under conditions hereinafter to be described.

The guard 10, is provided with a plurality of short ribs 30, so proportioned in length that the body of the weight will not pass below the same; and the collar is also provided with a plurality of ribs 31, proportioned in depth so that the bottom of the weight will never come in contact with one of these ribs 30. Thus, when the bottle is in a horizontal position the body of the weight will rest on one or more of the ribs 30; and all that the spring 29, will have to overcome to move the weight is the friction of the same with the rib, or ribs, as the weight is not resting on the spring but upon the ribs.

By the construction just described several advantages are gained; 1st, as the spring is compressed only when the weight is resting on the same, when the bottle is returned to a position where liquid would flow into the same by gravity, the spring will move the weight against the friction opposed by the weight and ribs, and will force the valve to its seat thereby preventing leakage; 2nd, the weight will always be held free from contact with the wall of the guard, so that the outflowing liquor will be free to flow around the same; and, 3rd, the ribs 31, will prevent the body of the weight coming close enough to the collar 25, to choke up the passageway.

As the weight toward the end of its movement to seat the valve has but a small portion thereof in engagement with the ribs 30, I prefer to make the inner edge of the ribs 31, substantially straight from the top of the collar to the lowermost point of the ribs whereby a socket is formed for the movement of the stem 28, and spring 29; and as the stem 28, is somewhat confined between these ribs the tipping of the weight will be prevented thereby holding the front edge of the weight free from contact with the walls of the guard chamber containing the valve, for if allowed to engage this wall, the friction would be greatly increased, and the valve might not always be closed. I thus reduce the friction on the weight to a minimum. As, however, the ribs 30, do not extend to the bottom of the guard thereby providing no guide for the valve and holder, and the valve can not be large enough to fill the whole passageway at the bottom of the guard or the liquid would not flow out: I have provided the cork disk 14, with a plurality of ribs 32, proportioned in length to engage the side walls of the valve chamber and centralize the valve and holder, and at the same time provide spaces for the liquid to flow past the valve. By this construction, also, the edges of the valve may project beyond the cork disk, as previously described, without danger of injury.

In order to still further reduce the friction between the weight and guard I prefer to mount a cork disk 33, on the stem of the weight. This will not lessen the capacity of the weight to compress the spring when the liquid is flowing from the bottle; but when trying to force liquid into the bottle by immersing the neck, the cork 33, will buoy up the weight to a considerable extent thereby reducing the friction.

In practice the guard with the inclosed parts is secured to a bottle by means of a metal collar 34, with an intervening gasket 35, by spinning the same thereon, or in any desired manner; and it is evident that this collar can carry any trade mark, or other counterfeitable mark so that it can not be removed and a new one used without detection, or by committing a crime. As means are provided against the admission of liquid without removing the guard, the bottle becomes non-refillable unless mutilated. At the same time means are provided to make the pouring of the contents therefrom an easy matter.

In Fig. 7, I have shown a modified form of construction. As here shown, the parts are all the same except the baffle plate 23′, of the guard 10′, and the stem 28′, of the weight 19′. The baffle plate carries a pendent, integral projection 36, and the stem is hollowed, or provided with a concaved end 37, while a ball 38, is adapted to assume by gravity the space between the projection 36, and wall of the socket 37, when the bottle is in an upright position. In practice I have found that when the weight is resting on a cork valve-holder there is sufficient adhesion between the same even when submerged to draw the valve momentarily from its seat. Thus, by keeping the guard full of liquid and providing for the entrance of air, or rather the escape of air, by quickly jumping the weight a small amount of liquid will enter the bottle. While I do not consider this a practical way to fill a bottle, I have shown this modified construction wherein means are provided to prevent the weight jumping when the bottle is in a position for the guard to hold liquid. In pouring the ball 38, would roll to one side of the projection 36, and the parts will act as previously described; but when the bottle is returned to an upright, or nearly upright position, the ball 38, will assume its place between the stem and projection, and the parts will be locked against jumping.

In both the preferred, and modified form, the inner wall of the valve chamber part of the guard should be glazed, or otherwise rendered as smooth as possible, and the ribs 30, must also be smooth as possible in order to reduce the friction as much as possible, as owing to the character and construction of the valve, and holder an effective bottle would not result except by the coöperation of the other parts with the valve to keep it on its seat at all times except when pouring.

Having thus described my invention, I claim:

1. In a non-refillable bottle having a valve seat, a valve adapted to engage said seat, means connected with said valve to position the same on said valve seat, a weight movable independently of said valve, said weight and said valve positioning means being adapted to be connected by moisture whereby said weight may draw said valve from said seat, for the purpose set forth.

2. In a non-refillable bottle having an opening, a closing device adapted to close said opening, a float forming a part of said closing device and adapted to support the same in liquid, and a weight movable independently of said closing device, said weight normally resting wholly on said closing device, and said weight and float having extensive contacting surfaces adapted to adhere when wet with a force less than the buoyancy of the closing device, for the purpose set forth.

3. In a non-refillable bottle having a valve-seat, a valve of thin pliable sheet metal adapted to engage said seat, a float secured to said valve and adapted to sustain the same, and an independently movable weight adapted to co-act with said valve, said weight being adapted to adhesively engage said float when the bottle is in an inverted position and the adhesive engagement being adapted to be broken by inflowing liquid, for the purposes set forth.

4. In a non-refillable bottle having a valve seat, a valve of thin pliable sheet metal adapted to engage said seat, means to position it on said seat, a weight movable independently of said valve, adapted to rest on said positioning means engaging the same, and draw the valve from its seat, and a spring having a tendency to force said weight against said positioning means but being compressible by the weight and having strength to move the weight when in a horizontal position with the valve free from said seat, for the purpose set forth.

5. In a non-refillable bottle having a valve seat, a valve adapted to engage said seat, a weight movable independently of said valve, a guard having a socket in which said weight is mounted, the side walls of said socket being provided with ribs on which said weight is adapted to rest when the bottle is in a horizontal position, and means to move said weight when resting on said ribs, for the purpose set forth.

6. In a non-refillable bottle having a valve seat, a valve adapted to engage said seat, a weight movable independently of said valve, a guard having a socket in which said weight is mounted, the side walls of said socket being provided with ribs on which said weight is adapted to rest when the bottle is in a horizontal position, and a spring adapted to move said weight when resting on said ribs, for the purpose set forth.

7. In a non-refillable bottle having a valve seat, a valve of thin pliable sheet metal adapted to engage said seat, a valve holder, said valve having a center rigidly connected with said holder and having free edges, a weight movable independently of said valve, a guard having a socket in which said weight is mounted, and a spring adapted to move said weight when in a horizontal position with the valve free from engagement with said seat, for the purpose set forth.

8. In a non-refillable bottle having a valve seat, a valve adapted to engage said seat, a weight movable independently of said valve, a guard having a socket in which said weight is mounted, the side walls of said socket being provided with ribs on which said weight is adapted to rest when the bottle is in a horizontal position, and a spring adapted to move said weight when resting on said ribs, for the purpose set forth.

9. In a non-refillable bottle, a valve composed of thin, pliable sheet tin, and a holder therefor comprising a disk of buoyant material having a perforated center with flaring walls, a tin rivet having a flat head adapted to engage the central part of said valve and having a shank passing through the center thereof, and entering said perforation, and a tin plug fused in said perforation and engaging said rivet shank and adjacent portions of said valve, as and for the purpose set forth.

10. In a non-refillable bottle, a valve composed of thin, pliable sheet tin, and a holder therefor comprising a disk of buoyant material having a perforated center with flaring walls, a tin rivet having a flat head adapted to engage the central part of said valve and having a shank passing through the center thereof and entering said perforation, and a tin plug fused in said perforation and engaging said rivet shank and adjacent portions of said valve, said valve having the edges thereof projecting beyond the edges of said disk, and the periphery of said disk being provided with projections, which project beyond the edges of said valve, as and for the purpose set forth.

11. In a non-refillable bottle, a valve and holder therefor, and a weight adapted to engage said valve holder adhesively when wet, said valve being of thin pliable sheet tin and said holder comprising a buoyant disk having a central opening, a rivet having a flat head adapted to support the central part of said valve and having a shank passing through the valve into said opening, and a tin plug formed in said opening and engaging said rivet shank and the surrounding portions of said valve.

12. A non-refillable bottle, comprising a bottle having a flat valve seat, a valve of thin, pliable sheet tin adapted to rest on said seat, a buoyant holder adapted to position said valve on said seat, a weight adapted to be adhesively connected with said holder by moisture, a guard adapted to inclose said valve, holder, and weight and prevent the engagement thereof by an instrument, means to secure said guard on said bottle, and means to move said weight in said guard when the bottle is in a horizontal position with the valve unseated.

13. In a non-refillable bottle, comprising a bottle having a flat valve seat, a valve of thin, pliable sheet tin adapted to rest on said seat, a buoyant holder adapted to position said valve on said seat, a weight adapted to be adhesively connected with said holder by moisture, a guard adapted to inclose said valve, holder and weight, and prevent the engagement thereof by an instrument, means to secure said guard on said bottle, said guard having internal ribs adapted to support said weight when not resting on said holder, and a spring adapted to move said weight when resting on part of said ribs, for the purpose set forth.

14. A non-refillable bottle comprising a bottle having a flat valve seat, a valve of thin, pliable sheet tin adapted to rest on said seat, a buoyant holder adapted to position said valve on said seat, a weight adapted to be adhesively connected with said holder by moisture, a guard adapted to inclose said valve, holder, and weight and prevent the engagement thereof with an instrument, means to secure said guard on said bottle, said guard having ribs on which said weight is adapted to rest when the bottle is in a horizontal position, a spring adapted to move said weight when resting on said ribs, and means to lock said valve on said seat when the bottle is upright, for the purpose set forth.

15. A non-refillable bottle, comprising a bottle having a flat valve seat, a valve of thin, pliable sheet tin adapted to rest on said seat, a buoyant holder adapted to position said valve on said seat, a weight adapted to be adhesively connected with said holder by moisture, a guard adapted to inclose said valve, holder and weight, means to secure said guard on said bottle, and means to lock said valve on said seat when the bottle is in an upright position, for the purpose set forth.

16. In a non-refillable bottle, a valve composed of thin, pliable sheet metal, and a holder, said holder having a buoyant disk with a perforated center, said valve having the central part thereof secured to said disk through said perforations, and being greater in diameter than said disk whereby the edges of said valve project beyond the edges of said disk, the periphery of said disk being provided with projections, or ribs, which project beyond the edges of said valve, as and for the purpose set forth.

17. In a non-refillable bottle, a valve of thin, pliable sheet tin, a holder therefor secured to the central part of said valve and adapted to float the same, and a weight adapted to engage said holder adhesively when wet and cause its movement through said adhesion, for the purpose set forth.

18. In a non-refillable bottle, a valve element and a holder element therefor, one of the elements having an opening therethrough, a device carried by the other element and projecting into the opening, but being of smaller cross sectional area than the same, and securing means in said opening, said device being embedded in the securing means.

19. A non-refillable bottle comprising a reservoir provided with a valve-compartment having a discharge orifice, a valve-seat intermediate the orifice and the reservoir, closing means including a float and weighted-means, movable with respect to the float, adapted and arranged to move the float away from the seat when the bottle containing liquid is tilted from an upright into a pouring position and toward the seat when the bottle is returned from a pouring to a horizontal position, and further means for preventing adhesion between the weighted-means and any adjacent surface, of any element of the bottle other than that of the float, sufficient to prevent the closing of the closing means when refilling with liquid is attempted.

20. A non-refillable bottle comprising a reservoir provided with a valve-compartment having a discharge orifice, a valve-seat intermediate the orifice and the reservoir, closing means including a float and weighted-means, movable with respect to the float, adapted and arranged to move the float away from the seat when the bottle containing liquid is tilted from an upright into a pouring position and toward the seat when the bottle is returned from a pouring to a horizontal position, and the configuration of the surfaces of the weighted-means as well as that of any adjacent surface, of any element of the bottle other than that of the float, being such that the adhesion between them is insufficient to prevent the closing of the closing means when refilling with liquid is attempted.

21. A non-refillable bottle comprising a reservoir provided with a valve-compartment having a discharge orifice, a valve seat intermediate the orifice and the reservoir, closing means including a float and weighted-means movable with respect to the float, adapted and arranged to move the float away from the seat when the bottle containing liquid is tilted from an upright into a pouring position and toward the seat when the bottle is returned from a pouring to a horizontal position, and spacing means between the weighted-means and adjacent surfaces of the device, other than that of the float, whereby the adhesion between the weighted-means and such surfaces is insufficient to prevent the closing of the closing means when refilling with liquid is attempted.

22. A non-refillable bottle comprising a reservoir provided with a valve-compartment having a discharge orifice, a valve-seat intermediate the orifice and the reservoir, a valve including a float, weighted-means, separate from the float, adapted and arranged to move the float away from the seat when the bottle containing the liquid is tilted from an upright into a pouring position and toward the seat when the bottle is returned from a pouring to a horizontal position, and further means for preventing adhesion between the weighted-means and any adjacent surface, of any element of the bottle other than that of the float, sufficient to prevent the closing of the valve when refilling with liquid is attempted.

23. A non-refillable bottle comprising a reservoir provided with a valve-compartment having a discharge orifice, a valve-seat intermediate the orifice and the reservoir, a valve including a float, weighted-means, separate from the float, adapted and arranged to move the float away from the seat when the bottle containing liquid is tilted from an upright into a pouring position and toward the seat when the bottle is returned from a pouring to a horizontal position, and the configuration of the surfaces of the weighted-means as well as that of the adjacent surface, of any element of the bottle other than that of the float, being such that the adhesion between them is insufficient to prevent the closing of the valve when refilling with liquid is attempted.

24. A non-refillable bottle comprising a reservoir provided with a valve-compartment having a discharge orifice, a valve-seat intermediate the orifice and the reservoir, a valve including a float, weighted-means, movable with respect to the float, adapted and arranged to move the float away from the seat when the bottle containing liquid is tilted from an upright into a pouring position and toward the seat when the bottle is returned from a pouring to a horizontal position, the float and the weighted-means having the contacting areas of their adjacent faces so formed as to render adhesion therebetween greater than the adhesion between the contacting faces of the valve-seat and the valve seated thereon, but less than the maximum buoyant effort of said float, and further means for preventing adhesion between the weighted-means and any adjacent surface of any element of the bottle other than that of the float, sufficient to prevent the closing of the valve when refilling with liquid is attempted.

25. A non-refillable bottle comprising a reservoir; an adjacent valve-compartment having a discharge orifice; a valve-seat intermediate the orifice and the reservoir; closing means including a float and weighted-means for normally sealing communication through said valve-seat, said weighted-means including a weight movable with respect to the float; that part of said closing means adjacent the valve-seat and including the float, constituting a float-valve and the arrangement of the members of said closing means being such that, when the bottle containing liquid is tilted from an upright to a pouring position, communication through said valve-seat is opened by the movement in response to gravity, of an element of said weighted-means, which in turn effects movement of the float in a direction away from the seat, and, when the bottle is returned from a pouring to a horizontal position, communication through said seat is closed by the movement of an element of said weighted-means, which in turn effects movement of the float in a direction toward said valve-seat; and the configuration of the surface of the weight, as well as that of any surface of an element of the bottle adjacent thereto, being such that adhesion between them is insufficient to prevent the closing of communication through the valve-seat when refilling with liquid is attempted.

26. A non-refillable bottle comprising a reservoir; an adjacent valve-compartment having a discharge orifice; a valve-seat intermediate the orifice and the reservoir; closing means including a float and weighted-means, for normally sealing communication through said valve-seat, said weighted-means including a weight movable with resepect to the float; that part of said closing means, adjacent the valve-seat and including the float, constituting a float-valve and the arrangement of the members of said closing means being such that, when the bottle containing liquid is tilted from an upright to a pouring position, communication through said valve-seat is opened by the movement in response to gravity, of an element of said weighted-means which in turn effects movement of the float in a direction away from the seat, and, when the bottle is returned from a pouring to a horizontal position, communication through said seat is closed by the movement of an element of said weighted-means which in turn effects movement of the float in a direction toward said valve-seat, and said valve-closure means also including further means for preventing adhesion between the surfaces of the weight and an element of the bottle adjacent thereto, sufficient to interfere with the closing of communication through the valve-seat when refilling with liquid is attempted.

27. A non-refillable bottle comprising a reservoir, an adjacent valve-compartment having a discharge orifice; a valve-seat intermediate the orifice and the reservoir; closing means including a float and weighted-means for normally sealing communication through said valve-seat, said weighted-means including a weight movable with respect to the float; the arrangement of the members of said closing means being such that, when the bottle containing liquid is tilted from an upright into a pouring position, communication through the valve-seat is opened by the movement, in response to gravity, of an element of the weighted-means adjacent the float, which in turn effects movement of the float in a direction away from the seat and when the bottle is returned from a pouring to a horizontal position, communication through said seat is closed by the movement of an element of the weighted-means adjacent the float, which in turn effects movement of the float in a direction toward said seat; and the configuration of the surface of the weight, as well as that of any surface of an element of the bottle adjacent thereto, being such that adhesion between them is insufficient to prevent the closing of communication through the valve-seat when refilling with liquid is attempted.

28. A non-refillable bottle comprising a reservoir; an adjacent valve-compartment having a discharge orifice; a valve-seat intermediate the orifice and the reservoir; closing-means including a float and weighted-means for normally sealing communication through said valve-seat, said weighted means including a weight movable with respect to the float; the arrangement of the members of said closing means being such that when the bottle containing liquid is tilted from an upright into a pouring position, communication through the valve-seat is opened by the movement, in response to gravity, of an element of the weighted-means adjacent the float, which in turn effects movement of the float in a direction away from the seat, and when the bottle is returned from a pouring to a horizontal position, communication through said seat is closed by movement of an element of the weighted-means adjacent the float, which in turn effects movement of the float in a direction toward said seat; and said valve-closure means also including further means for preventing adhesion between the surfaces of the weight and an element of the bottle adjacent thereto, sufficient to interfere with the closing of communication through the valve-seat when refilling with liquid is attempted.

29. A non-refillable bottle comprising a reservoir, an adjacent valve-compartment having a discharge orifice, a valve-seat intermediate the orifice and the reservoir, closing-means including a float and weighted-means for normally sealing communication through said valve-seat, said weighted means including a weight movable with respect to the float; the arrangement of the members of said closing means being such that, when the bottle containing liquid is tilted from an upright into a pouring position, communication through the valve-seat is opened by the movement, in response to gravity, of an element of the weighted-means adjacent the float, which in turn effects movement of the float in a direction away from the seat and when the bottle is returned from a pouring to a horizontal position, communication through said seat is closed by movement of an element of the weighted-means adjacent the float, which in turn effects movement of the float in a direction toward said seat; means including a gravity-responsive movable element adapted to lock said float-valve when the bottle is in a substantially upright position, and thereby prevent the movement of the float-valve, when submerged in liquid, off of its seat, by shaking; and the configuration of the surface of the weight, as well as that of any surface of an element of the bottle adjacent thereto, being such that adhesion between them is insufficient to prevent the closing of communication through the valve-seat when refilling with liquid is attempted.

30. A non-refillable bottle comprising a reservoir, an adjacent valve-compartment having a discharge orifice; a valve-seat intermediate the orifice and the reservoir; closing-means including a float and weighted-means for normally sealing communication through said valve seat, said weighted-means including a weight movable with respect to the float; that part of said closing-means adjacent the valve-seat and including the float constituting a float-valve, and the arrangement of the members of said closing-means being such that, when the bottle containing liquid is tilted from an upright to a pouring position, communication through said valve-seat is opened by the movement, in response to gravity, of an element of said weighted-means, which in turn effects movement of the float in a direction away from the seat, and, when the bottle is returned from a pouring to a horizontal position, communication through said seat is closed by the movement of an element of said weighted-means, which in turn effects movement of the float in a direction toward said valve-seat; a guard provided with a socket into which said weight is adapted to project when the bottle is in a pouring position, said guard being provided with spacing means adapted to prevent extensive contact between the adjacent surfaces of said weight and said guard sufficient to prevent the closing of communication through the valve-seat when refilling with liquid is attempted.

New York, March 14, 1916.

GARRY P. VAN WYE.